US012562652B2

(12) United States Patent
Chen et al.

(10) Patent No.: US 12,562,652 B2
(45) Date of Patent: Feb. 24, 2026

(54) ELECTRONIC TRANSFORMER AND THREE-PHASE FOUR-WIRE POWER SYSTEM THEREOF

(71) Applicant: DELTA ELECTRONICS, INC., Taoyuan (TW)

(72) Inventors: Si-Wei Chen, Taoyuan (TW); Wen-Hao Kuo, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 367 days.

(21) Appl. No.: 18/055,415

(22) Filed: Nov. 15, 2022

(65) Prior Publication Data

US 2024/0063728 A1     Feb. 22, 2024

(30) Foreign Application Priority Data

Aug. 18, 2022    (CN) .......................... 202210991062.8

(51) Int. Cl.
H02M 7/217 (2006.01)
H02M 1/42 (2007.01)
H02M 7/219 (2006.01)

(52) U.S. Cl.
CPC ....... H02M 7/2173 (2013.01); H02M 1/4216 (2013.01); H02M 7/219 (2013.01)

(58) Field of Classification Search
CPC .. H02M 7/2173; H02M 7/2176; H02M 7/219; H02M 7/2195; H02M 7/23;

(Continued)

(56) References Cited

U.S. PATENT DOCUMENTS

| | | | |
|---|---|---|---|
| 3,081,424 A | 3/1963 | Dortort | |
| 4,924,371 A | 5/1990 | Peterson | |

(Continued)

FOREIGN PATENT DOCUMENTS

| | | |
|---|---|---|
| CN | 201409093 Y | 2/2010 |
| CN | 101369784 B | 2/2011 |

(Continued)

OTHER PUBLICATIONS

English translation CN103986345 (Year: 2014).*
English translation CN101369784 (Year: 2011).*

*Primary Examiner* — Nguyen Tran
(74) *Attorney, Agent, or Firm* — CKC & Partners Co., LLC

(57) ABSTRACT

An electronic transformer includes a first forward rectifier, a second forward rectifier, a third forward rectifier and a backward rectifier. The first forward rectifier is coupled between a first-phase power and a first output terminal. The second forward rectifier is coupled between a second-phase power and the first output terminal. The third forward rectifier is coupled between a third-phase power and the first output terminal. The backward rectifier is coupled between a neutral line and a second output terminal. The first forward rectifier, the second forward rectifier, and the third forward rectifier are configured to half-wave rectify the first-phase power, the second-phase power, and the third-phase power to generate rectified first-phase to third-phase power sources, and superimpose the rectified first-phase to third-phase power sources on the first output end to serve as an output voltage of the electronic transformer.

18 Claims, 11 Drawing Sheets

40

<u>4</u>

(58) Field of Classification Search
CPC ............ H02M 7/25; H02M 7/26; H02M 7/28;
H02M 7/217; H02M 7/213; H02M 7/21;
H02M 7/02; H02M 7/08; H02M 7/155;
H02M 7/1621; H02M 7/623; H02M
1/4216; H02M 1/425; H02M 1/42; H02M
1/4028
See application file for complete search history.

(56) References Cited

U.S. PATENT DOCUMENTS

| | | | |
|---|---|---|---|
| 5,051,883 A * | 9/1991 | Cheng | H02M 7/155 |
| | | | 363/129 |
| 2012/0120697 A1 | 5/2012 | Cuk | |

FOREIGN PATENT DOCUMENTS

| | | | |
|---|---|---|---|
| CN | 201976015 U | 9/2011 | |
| CN | 202602348 U | 12/2012 | |
| CN | 103986345 A | 8/2014 | |
| CN | 104052074 A | 9/2014 | |
| CN | 104993721 A | 10/2015 | |
| CN | 107748346 A | 3/2018 | |
| CN | 112366962 B | 11/2021 | |
| JP | S3517020 Y | 7/1960 | |
| JP | S4610331 Y1 | 4/1971 | |
| JP | S4714258 U | 10/1972 | |
| JP | H0731150 A | 1/1995 | |
| JP | H08228436 A | 9/1996 | |
| JP | 2000060130 A | 2/2000 | |
| JP | 2006180652 A | 7/2006 | |
| JP | 2017112784 A | 6/2017 | |
| JP | 6361217 B2 | 7/2018 | |
| TW | 201135156 A | 10/2011 | |
| TW | I487431 B | 6/2015 | |
| TW | 202143624 A | 11/2021 | |

* cited by examiner

ELECTRONIC TRANSFORMER AND THREE-PHASE FOUR-WIRE POWER SYSTEM THEREOF

RELATED APPLICATIONS

This application claims priority to China Application Serial Number 202210991062.8, filed on Aug. 18, 2022, which is herein incorporated by reference.

BACKGROUND

Field of the Invention

The present disclosure relates to an electronic transformer, and more particularly to an electronic transformer and a three-phase four-wire power system thereof.

Description of Related Art

Electronic transformers or coil transformers are devices that combine power electronic conversion technology and high-frequency electric energy conversion technology based on the principle of electromagnetic induction to realize electric energy transformation from one electric characteristic into another one. However, as to the aspect of transformation from three-phase alternating current (AC) voltages to a direct current (DC) voltage, conventional coil transformers have the drawbacks of high heat consumption, high power consumption, hard installation, low efficiency and inconvenient transportation. In view of this, the industry is now working on development of a miniaturized electronic transformer in replace of conventional coil transformers.

SUMMARY

One aspect of the present disclosure directs to an electronic transformer which includes a first forward rectifier, a second forward rectifier, a third forward rectifier and a backward rectifier. The first forward rectifier is coupled between a first-phase power source and a first output terminal; the second forward rectifier is coupled between a second-phase power source and the first output terminal; the third forward rectifier is coupled between a third-phase power source and the first output terminal; and the backward rectifier is coupled between a neutral line and a second output terminal. The first forward rectifier, the second forward rectifier and the third forward rectifier are configured to perform half-wave rectification on the first-phase power source, the second-phase power source and the third-phase power source to generate a rectified first-phase power source, a rectified second-phase power source and a rectified third-phase power source, and to superpose the rectified first-phase power source, the rectified second-phase power source and the rectified third-phase power source at the first output terminal as an output voltage of the electronic transformer.

Another aspect of the present disclosure directs to a three-phase four-wire power system which includes a power supply and a load as well as the aforementioned electronic transformer. The power supply includes a neutral line, and is configured to provide a first-phase power source, a second-phase power source and a third-phase power source. The electronic transformer is coupled between the power supply and the load, and is configured to convert the first-phase power source, the second-phase power source and the third-phase power source into an output voltage to the load.

The electronic transformer and the three-phase four-wire power supply system thereof according to the present disclosure perform half-wave rectification on the three-phase power sources respectively through three forward rectifiers to generate an output current with balanced distribution at the first output end. In addition, after being rectified by the backward rectifier, the return current generated by the load returns to the power supply through the neutral line, such that a complete current loop is formed between the power supply, the electronic transformer and the load, and the operations of the forward output current and the backward return current are symmetrical and balanced, thereby improving the operational efficiency of the three-phase four-wire power supply system. Therefore, the present disclosure solves the problem that certain components are damaged in a short time due to unbalanced current distribution. Moreover, the present disclosure does not need to be configured as a three-phase three-wire structure for the use of back-end products, and the design of the electronic transformer of the present disclosure is simpler than that of a conventional electronic transformer. The electronic transformer and the three-phase four-wire power supply system thereof according to the present disclosure have the following advantages: (1) stable output voltage; (2) output current with balanced distribution; (3) simplified circuit design as well as less layout area and cost; and (4) stable and time-invariant operating temperature.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

DETAILED DESCRIPTION

The detailed explanation of the invention is described as following. The described preferred embodiments are presented for purposes of illustrations and description, and they are not intended to limit the scope of the invention.

Figure 1:
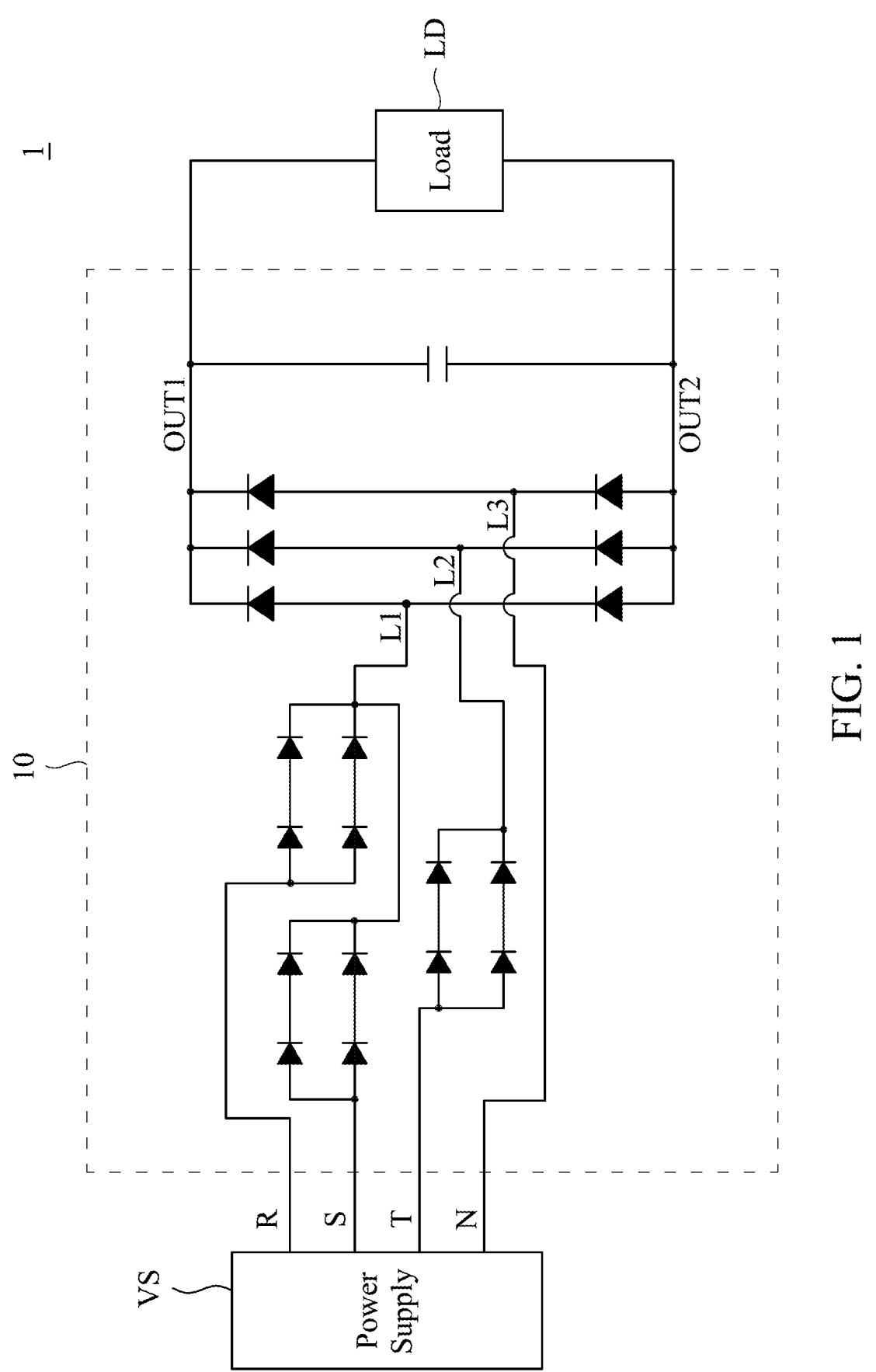
FIG. 1 is a schematic diagram of a three-phase four-wire power system.

FIG. 1 is a schematic diagram of a three-phase four-wire power system (hereinafter abbreviated "system") 1. The system 1 includes a power supply VS, an electronic trans- former 10 and a load LD. The power supply VS transmits three-phase power sources R, S, T to the electronic trans- former 10 respectively through three live lines. The elec- tronic transformer 10 performs rectification on the first phase power source R, the second phase power source S and the third phase power source T respectively through three bridge rectifiers for supplying power to the load LD. The electronic transformer 10 includes a front-end bridge trans- forming circuit and back-end six-phase inverters. In opera- tion, the bridge transforming circuit is configured to perform rectifying transformation on the first phase power source R, the second phase power source S and the third phase power source T before the node L1, L2, L3; the six-phase inverters perform a secondary rectification after the nodes L1, L2, L3; the capacitor 15 is connected between the first output terminal OUT1 and the second output terminal OUT2, and is used to store energy and filter the rectified voltage, so as to provide the smoothened (i.e. filtered) voltage to the load LD.

However, in the electronic transformer 10, the design of the bridge transforming circuit results in unbalanced voltage distribution. Specifically, the two bridge rectifiers which respectively receive the first phase power source R and the second phase power source S are connected to the node L1; the bridge rectifier which receives the third phase power source T is connected to the node L2; and the neutral line N is directly connected to the node L3. Therefore, the trans- formed voltages respectively from the first phase power source R and the second phase power source S are simul- taneously transmitted to the six-phase inverters through the node L1; the transformed voltage from the third phase power source T is transmitted to the six-phase inverters through the node L2; and the neutral line N is connected to the six-phase inverters through the node L3. However, the power supply VS does not provide any energy to the neutral line N. Unbalanced currents would be induced if the unbalanced voltages are transmitted to the six-phase inverters for recti- fication. With the operation time of the electronic trans- former 10 continuously elapses, specific elements (e.g., the diode connected to the node L1) are damaged faster than the other elements because of heat due to more frequent high current. In addition, in the power system, the lines of the three-phase power sources R, S, T may not be adapted in order, and thus the elements heated due to high current are not fixed, resulting in difficulty of product troubleshooting in the future.

Figure 2:
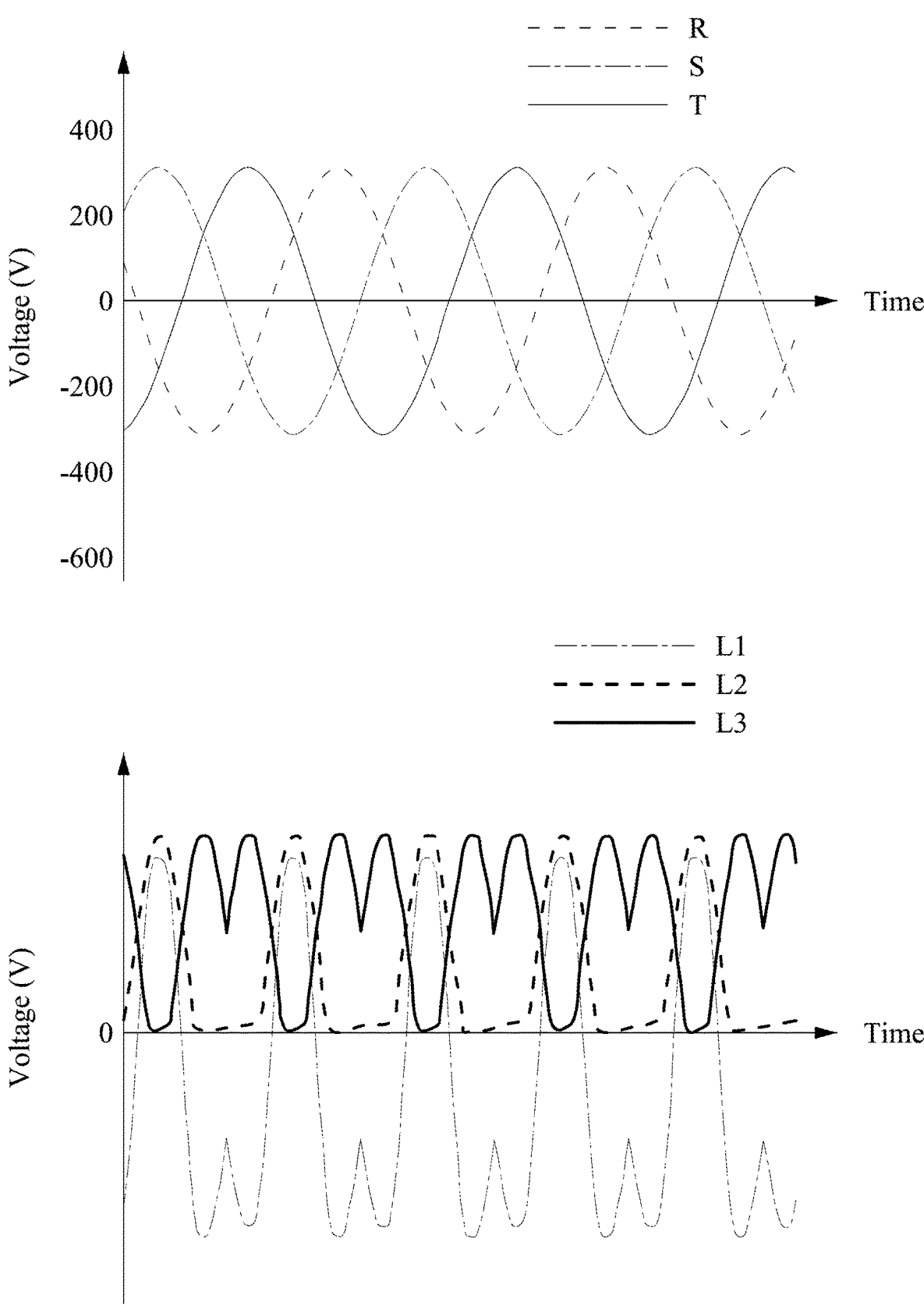
FIG. 2 is a voltage waveform diagram of the three-phase power sources and the three nodes of the electronic transformer in FIG. 1.

FIG. 2 is a voltage waveform diagram of the three-phase power sources R, S, T and the nodes L1, L2, L3 of the electronic transformer 10 in FIG. 1. The three-phase power sources R, S, T are alternating-current voltages with the same amplitude and frequency as well as phases displaced with respect to each other by 120 degrees; the line voltage of each may be such as 380 volts, and the phase voltage of each may be such as 220 volts, but the present disclosure is not limited thereto. The transformed voltages respectively from the first phase power source R and the second phase power source S are simultaneously transmitted through the node L1, and thus the node L1 bears a doubled current stress. The transformed voltage from the third phase power source T is transmitted through the node L2, and thus the node L2 bears a normal current stress. Moreover, the power supply VS does not provide energy to the neutral line N, and thus the voltage of the node L3 originates from the backward voltage of the load LD. As can be seen from FIG. 2, the voltages and the currents distributed to the nodes L1, L2, L3 are unbalanced.

Figure 3:
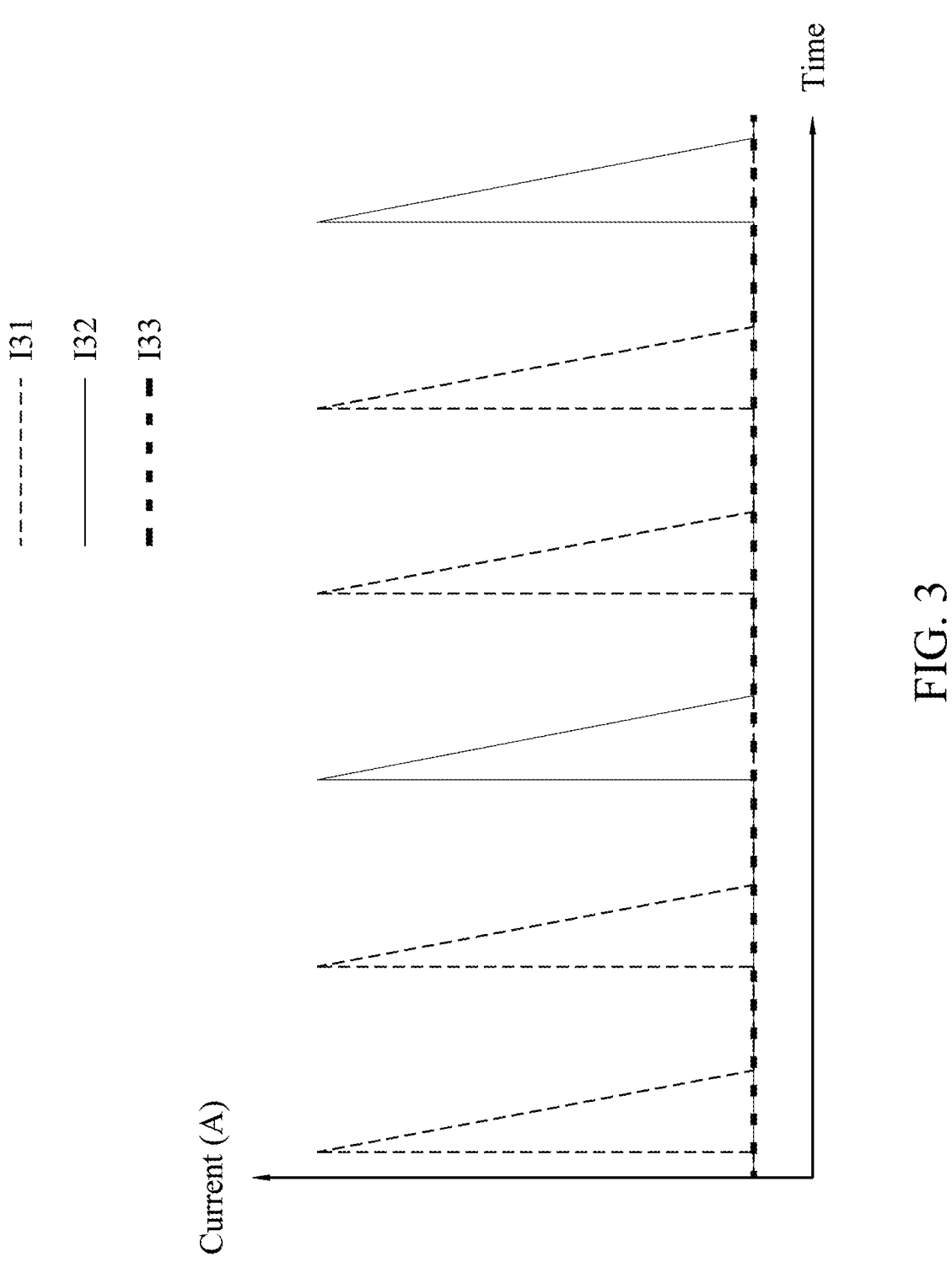
FIG. 3 is a current waveform diagram of the first output terminal of the electronic transformer in FIG. 1.

FIG. 3 is a current waveform diagram of the first output terminal OUT1 of the electronic transformer 10 in FIG. 1. The currents I31, I32, I33 are the currents flowing to the first output terminal OUT1 respectively from the nodes L1, L2, L3 through the diodes. At the first output terminal OUT1, the current I31 is generated according to the transformed volt- ages of the first phase power source R and the second phase power source S, and thus has a sawtooth waveform of two phases; the current I32 is generated according to the trans- formed voltage of the third phase power source T, and thus has a sawtooth waveform of one phase; the current I33 is generated according to the transformed voltage of the neu- tral line N, and thus keeps at zero current without having any sawtooth waveform with one phase. As can been from the above, the electronic transformer 10 has the problem of unbalanced currents during operation. In a condition in which the electronic transformer 10 is used for a long time, specific elements for generating the current I31 are damaged faster than the other elements because of heat and rising temperature due to more frequent high current. In addition, more electrical components are needed to be arranged for the electronic transformer 10 in FIG. 1, and thus more layout area is needed.

Figure 4:
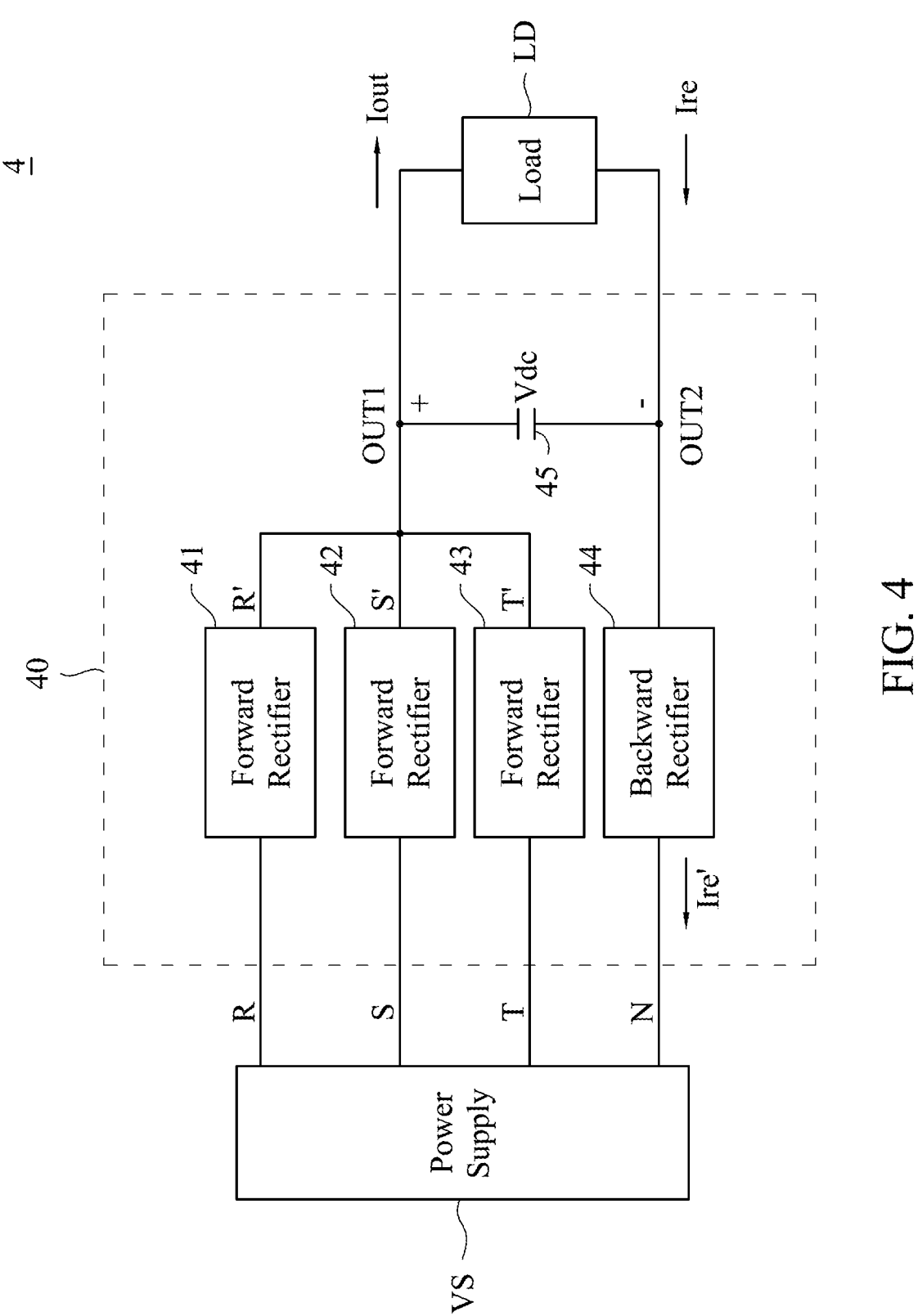
FIG. 4 is a schematic diagram of a three-phase four-wire power system in accordance with some embodiments of the present disclosure.

FIG. 4 is a schematic diagram of a three-phase four-wire power system 4 in accordance with some embodiments of the present disclosure. The three-phase four-wire power system 4 includes a power supply VS, an electronic trans- former 40 and a load LD. The electronic transformer 40 is coupled between the power supply VS and the load LD, and is configured to receive the first phase power source R, the second phase power source S and he third phase power source T from the power supply VS and then to supply power to the load LD by preforming a rectifying transfor- mation on the first phase power source R, the second phase power source S and the third phase power source T as well as being stored and filtered by the capacitor.

Structurally, the electronic transformer 40 includes a first forward rectifier 41, a second forward rectifier 42, a third forward rectifier 43, a backward rectifier 44 and a capacitor 45. The first forward rectifier 41 is coupled between the first phase power R of the power supply VS and the first output terminal OUT1; the second forward rectifier 42 is coupled between the second phase power S of the power supply VS and the first output terminal OUT1; the third forward rectifier 43 is coupled between the third phase power T of the power supply VS and the first output terminal OUT1; and the backward rectifier 44 is coupled between the neutral line N of the power supply VS and the second output terminal OUT2. The capacitor 45 is connected between the first output terminal OUT1 and the second output terminal OUT2. The second output terminal OUT2 is grounded.

In operation, the first forward rectifier 41, the second forward rectifier 42 and the third forward rectifier 43 are configured to perform half-wave rectification respectively on the first phase power source R, the second phase power source S and the third phase power source T to generate a rectified first phase power source R', a rectified second phase power source S' and a rectified third phase power source T', and the rectified first phase power source R', the rectified second phase power source S' and the rectified third phase power source T' are superposed at the first output terminal OUT1. The capacitor 45 is used to smooth (i.e. filter) the superposed power at the first output terminal OUT1 as the output voltage Vdc that is provided to the load LD. The current distribution is balanced because the first forward rectifier 41, the second forward rectifier 42 and the third forward rectifier 43 perform half-wave rectifications respectively on the first phase power source R, the second phase power source S and the third phase power source T. As a result, the electronic transformer 40 and the three-phase four-wire power system 4 of the present disclosure solves the problems of specific elements being damaged in a short time due to more frequent high current (i.e. unbalanced current distribution).

Then, after the load LD receives the output voltage Vdc, the return current Ire generated by the load LD further passes through the second output terminal OUT2 to flow into the electronic transformer 40. The backward rectifier 44 is configured to perform half-wave rectification on the return current Ire to generate the rectified return current Ire', and transmits the rectified return current Ire' back to the power supply VS through the neutral line N.

Simply speaking, in the electronic transformer 40, the half-wave rectification is performed on the first phase power source R, the second phase power source S and the third phase power source T respectively through the first forward rectifier 41, the second forward rectifier 42 and the third forward rectifier 43, and the rectified first phase power source R', the rectified second phase power source S' and the rectified third phase power source T' are superposed at the first output terminal OUT1, and then the superposed voltage at the first output terminal OUT1 is smoothened (i.e. filtered) through the capacitor 45 as the output voltage Vdc provided to the load LD. Thereafter, the backward rectifier 44 performs half-wave rectification on the return current Ire generated by the load LD, and returns the rectified return current Ire' to the power supply VS through the neutral line N.

From another point of view, the three-phase power sources R, S, T generated by the power supply VS and rectified respectively through the three forward rectifiers 41, 42, 43 of the electronic transformer 40 are aggregated via the first output terminal OUT1 to form the output current Iout that flows into the load LD; thereafter, the return current Ire generated by the load LD and rectified by the backward rectifier 44 of the electronic transformer 40 returns to the power supply VS through the neutral line N. As such, a complete current loop is formed between the power supply VS, the electronic transformer 40 and the load LD, and the operations on the forward output current Iout and the backward return current Ire are symmetrical and balanced, thereby improving the operational efficiency of the three-phase four-wire power system 4.

Figure 5:
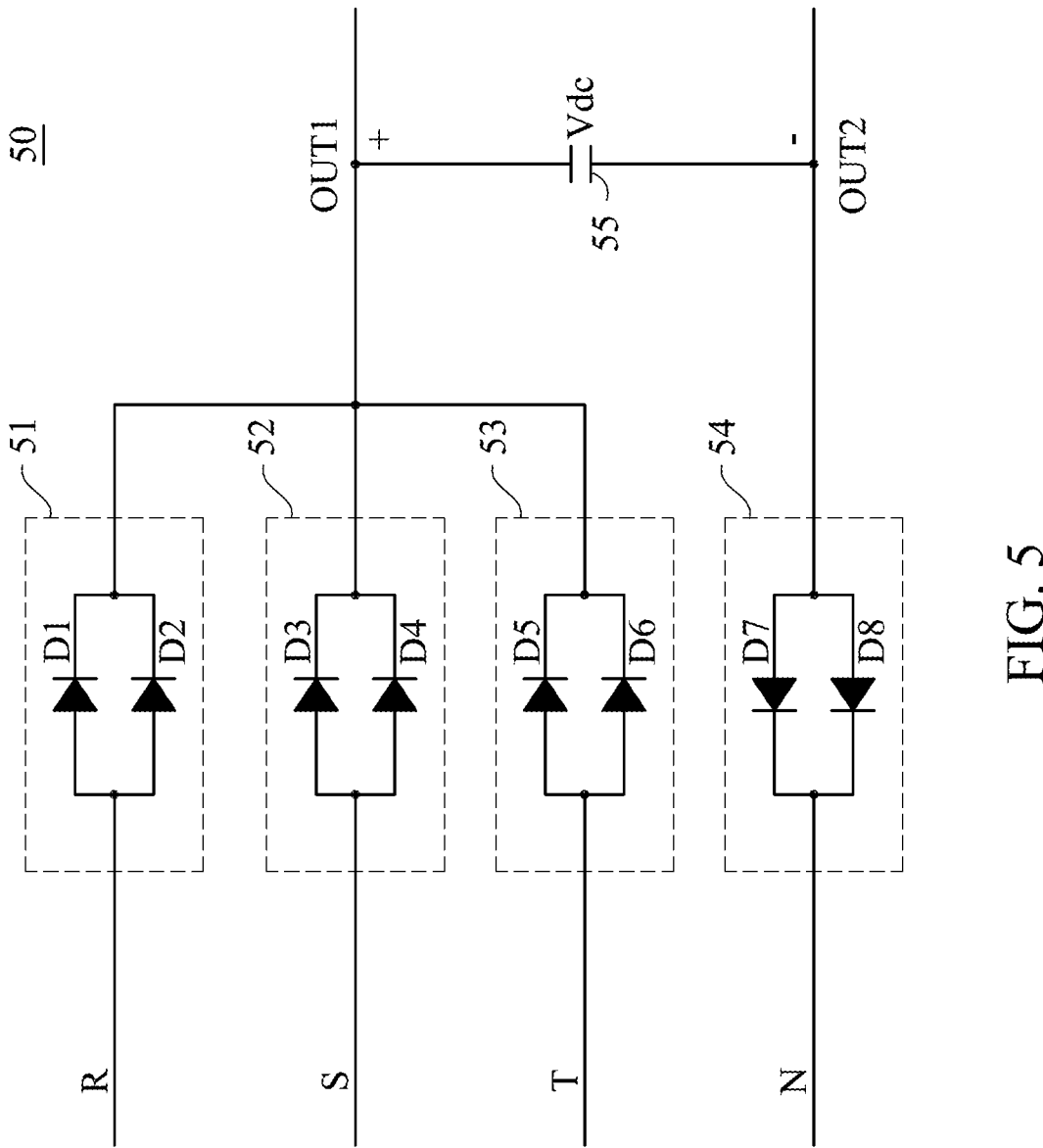
FIG. 5 is a schematic diagram of an electronic transformer in accordance with some embodiments of the present disclosure.

FIG. 5 is a schematic diagram of an electronic transformer 50 in accordance with some embodiments of the present disclosure. The electronic transformer 50 is applicable to the three-phase four-wire power system 4 in FIG. 4 in replace of the electronic transformer 40. Structurally, the electronic transformer 50 includes a first forward rectifier 51, a second forward rectifier 52, a third forward rectifier 53, a backward rectifier 54 and a capacitor 55. The first forward rectifier 51 includes diodes D1, D2; the second forward rectifier 52 includes diodes D3, D4; the third forward rectifier 53 includes diodes D5, D6; and the backward rectifier 54 includes diodes D7, D8.

In the embodiment, each of the rectifiers 51, 52, 53, 54 includes two diodes that are connected in parallel (e.g., in the rectifier 51, the diodes D1, D2 are connected in parallel). In the first forward rectifier 51, the anode of each of the diodes D1, D2 is coupled to the first phase power source R; in the first forward rectifier 51, the anode of each of the diodes D3, D4 is coupled to the second phase power source S; in the third forward rectifier 53, the anode of each of the diodes D5, D6 is coupled to the third phase power source T; and the cathode of each of the diodes D1, D2, D3, D4, D5, D6 in the first forward rectifier 51, the second forward rectifier 52 and the third forward rectifier 53 is coupled to the first output terminal OUT1. The cathode of each of the diodes D7, D8 in the backward rectifier 54 is coupled to the neutral line N, and the anode of each of the diodes D7, D8 in the backward rectifier 54 is coupled to the second output terminal OUT2. The capacitor 55 is connected between the first output terminal OUT1 and the second output terminal OUT2. The operating method of the electronic transformer 50 is similar to that of the electronic transformer 40, and thus the description thereof is not repeated herein.

It is noted that each of the rectifiers 51, 52, 53, 54 has K identical diodes D1, D2, . . . , DK, and then the total current I_TOTAL, the total power P_TOTAL and the total resistance R_TOTAL of these K diodes D1, D2, . . . , DK connected in parallel may be represented by the following equations (1), (2), (3) (where "*" denotes a multiplication sign):

$$I\_TOTAL = I\_D1 + I\_D2 + \ldots + I\_DK = K * I\_D \quad (1)$$

$$P\_TOTAL = I\_TOTAL^2 * R\_TOTAL \quad (2)$$

$$\frac{1}{R\_TOTAL} = \frac{1}{R\_D1} + \frac{1}{R\_D2} + \ldots + \frac{1}{R\_DK}, \quad (3)$$

$$R\_D1 = \ldots = R\_DK \rightarrow R\_TOTAL = \frac{R\_D}{K},$$

where the currents I_D1, I_D2, . . . , I_DK respectively through the diodes D1, D2, . . . , DK are all I_D, and the resistivity of each of the diodes D1, D2, . . . , DK is R_D. For each rectifier, as can be seen from equations (1), (2), (3), the total power P_TOTAL is in reverse proportion to the number of diodes K (because the total current remains unchanged). That is, the overall power loss of the rectifier is reduced as the number of diodes K connected in parallel increases.

The current through each of the K diodes connected in parallel are listed in Table 1 shown below.

TABLE 1

| Number of Diodes K | Diode Current |
|---|---|
| 1 | 1.00*I_TOTAL |
| 2 | 0.50*I_TOTAL |
| 3 | 0.33*I_TOTAL |
| 4 | 0.25*I_TOTAL |
| 5 | 0.20*I_TOTAL |
| 6 | 0.17*I_TOTAL |

As can be seen from Table 1, the two currents respectively corresponding to the number K of 5 and 6 differ by 3%, and the degree of current drop is already insignificant. By comprehensively considering the power consumption and the layout area of the electronic transformer 50, in some embodiments, the number of diodes K connected in parallel in each of the rectifiers 51, 52, 53, 54 may be 2 to 5. In addition, in comparison with the electronic transformer 10 shown in FIG. 1 in which more electrical components (i.e. three bridge rectifiers and six-phase inverters) are disposed, the electronic transformer 40 shown in FIG. 4 has less electrical elements disposed therein for saving the layout area.

In one embodiment, each of the diodes D1, D2, D3, D4, D5, D6, D7, D8 is a PN junction diode or a fast recovery diode.

Figure 6:
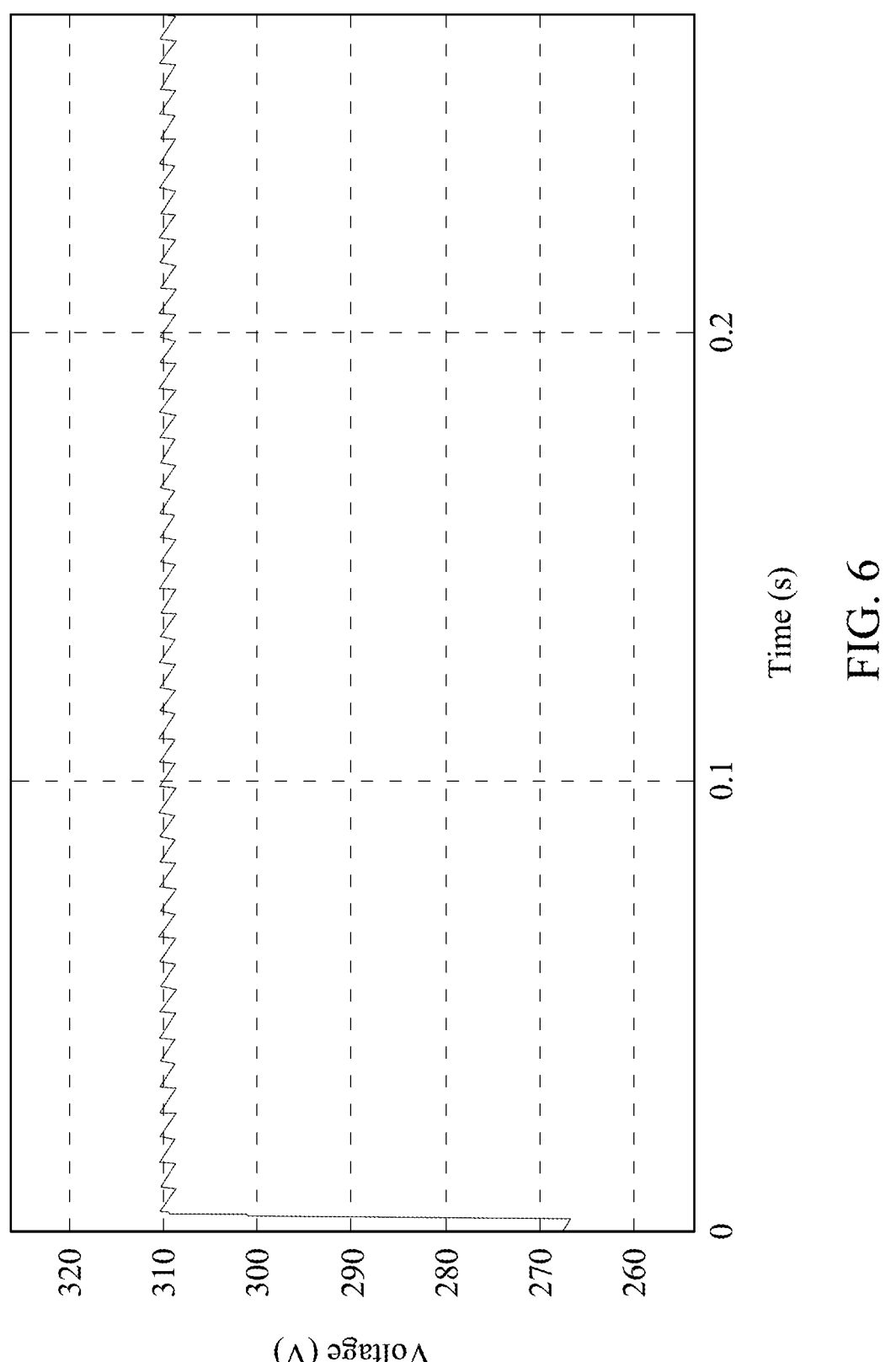
FIG. 6 is a waveform diagram of the output voltage of the electronic transformer shown in FIG. 5.

FIG. 6 is a waveform diagram of the output voltage Vdc of the electronic transformer 50 shown in FIG. 5. With the structure of balanced voltages and currents, selecting a suitable energy storing and filtering capacitor 55 obtains a relatively stable output voltage in comparison with the conventional electronic transformer with two-stage rectification and has advantages.

Figure 7:
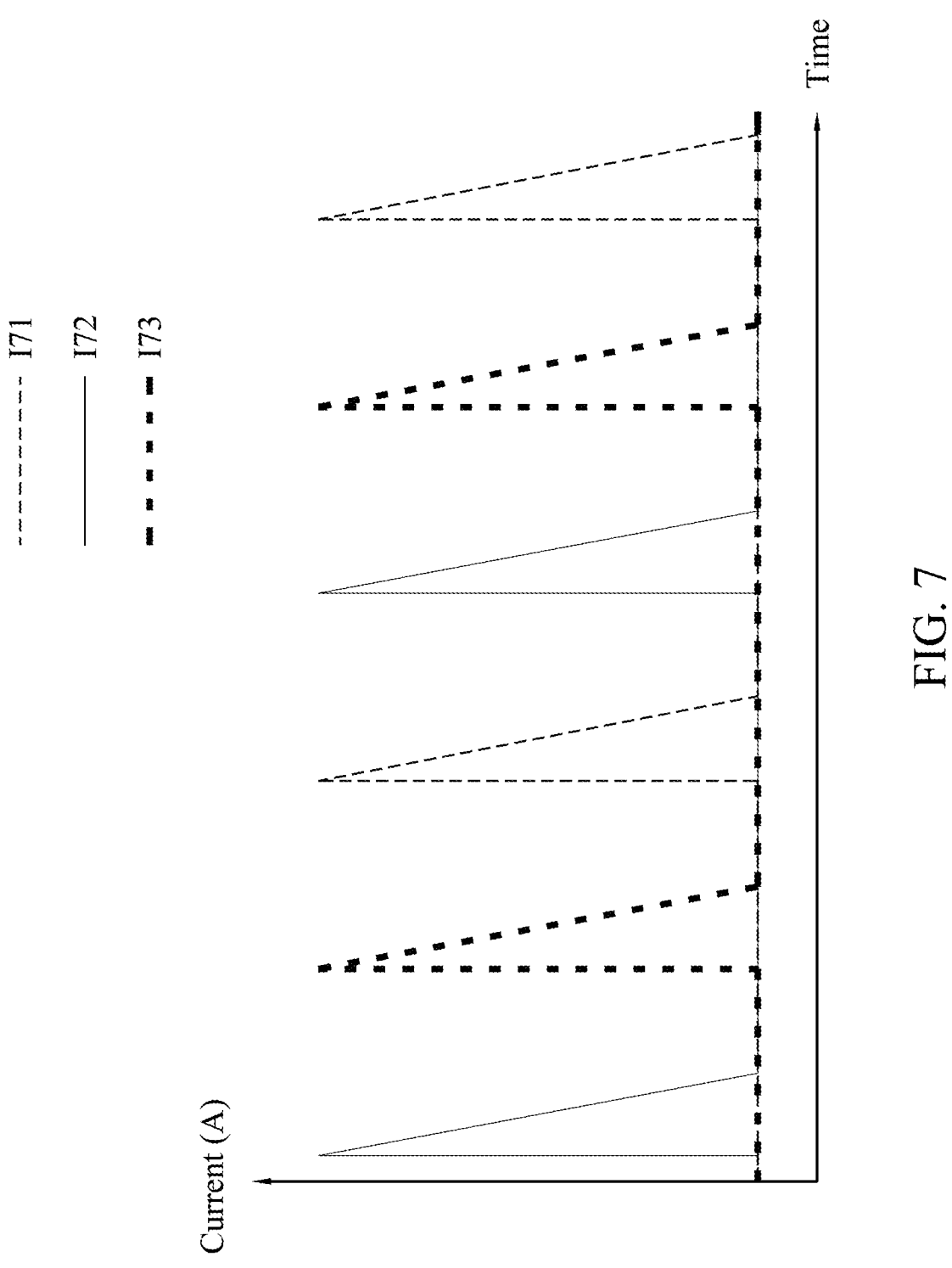
FIG. 7 is a waveform diagram of the output current of the electronic transformer shown in FIG. 5.

FIG. 7 is a waveform diagram of the output current Iout of the electronic transformer 50 shown in FIG. 5, in which currents I71, I72, I73 are the currents respectively outputted by the forward rectifiers 51, 52, 53. The currents I71, I72, I73 are aggregated at the first output terminal OUT1 to form the output current Iout of the electronic transformer 50. As can be seen from FIG. 7, a half-wave rectification is performed on the three-phase power sources R, S, T balancedly passing through the forward rectifiers 51, 52, 53, and therefore the currents I71, I72, I73 with balanced distribution can be generated. As a result, the electronic transformer 50 of the present disclosure solves the problem of specific elements being damaged in a short time due to more frequent high current (i.e. unbalanced current distribution).

Figure 8:
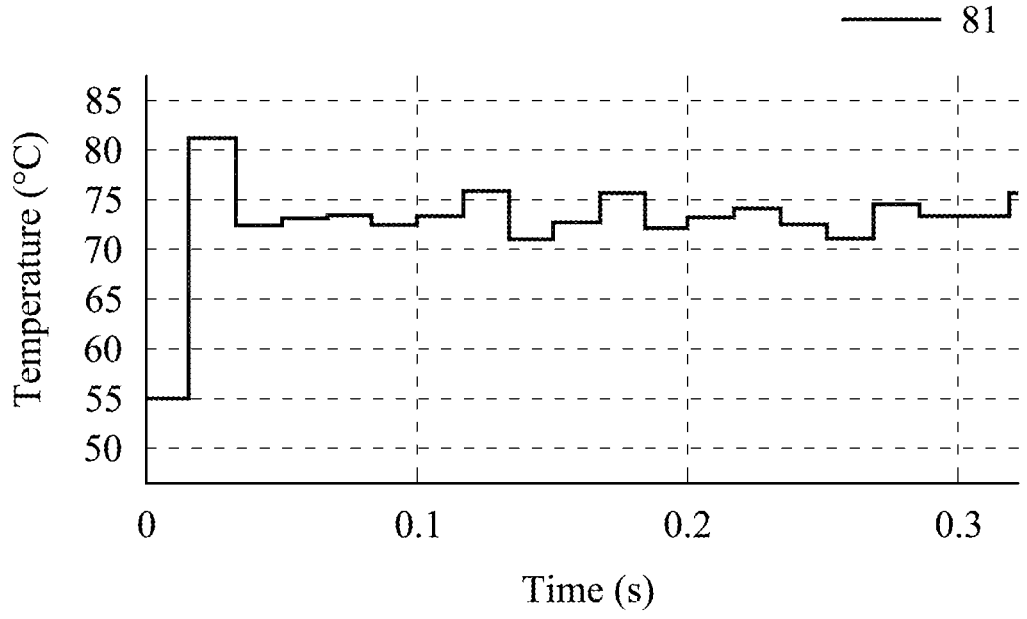
FIG. 8 is a temperature change diagram of the electronic transformer shown in FIG. 5 in 100% load and 150% load operating conditions.
Figure 8:
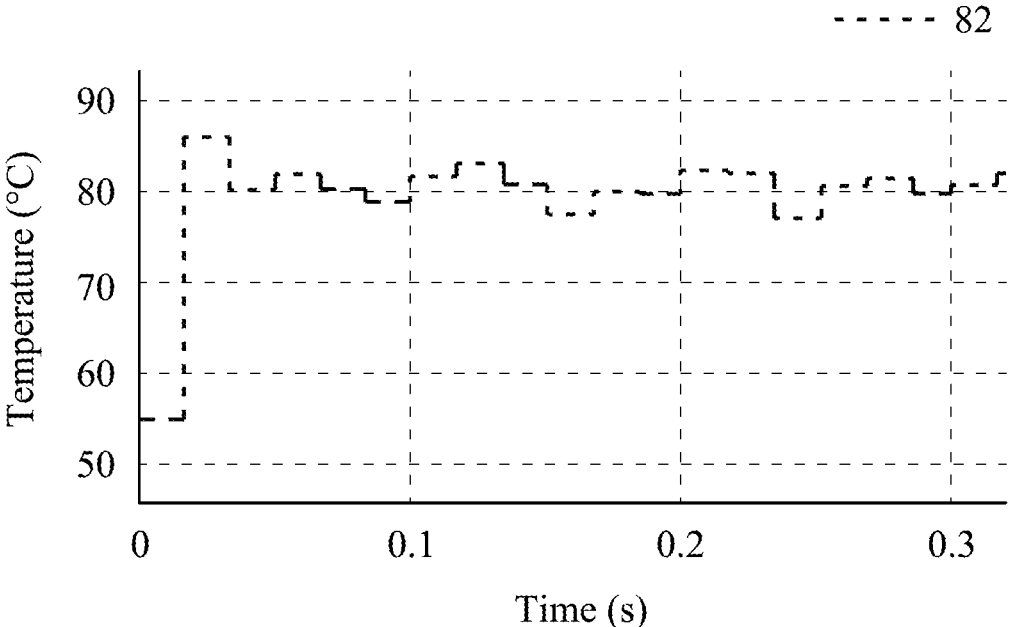

FIG. 8 is a temperature change diagram of the electronic transformer 50 shown in FIG. 5 in 100% load and 150% load operating conditions, in which curves 81, 82 respectively correspond to temperature changes of 100% load and 150% load. As can be seen from FIG. 8, except the moment in the early stage of powering at which the temperature rises to the maximum temperature, with the operation time continuously elapses, in a full-load (100% load) operating condition, the temperature of the electronic transformer 50 can be kept in a specific range (e.g. 71 to 77° C.) rather than gradually increasing with time. In addition, in an overload (150% load) operating condition, the temperature of the electronic transformer 50 can be kept in a specific range (e.g. 78 to 84° C.) rather than gradually increasing with time. Therefore, the electronic transformer 50 of the present disclosure has the advantage of stable and time-invariant temperature.

The test conditions and the results of the electronic transformer 50 are summarized in Table 2 shown below.

TABLE 2

| Test Condition | Output Voltage | Highest Temperature | Environmental Temperature |
|---|---|---|---|
| 100% Load | 310 V | 81° C. | 55° C. |
| 150% Load | 310 V | 86° C. | 55° C. |

Figure 9:
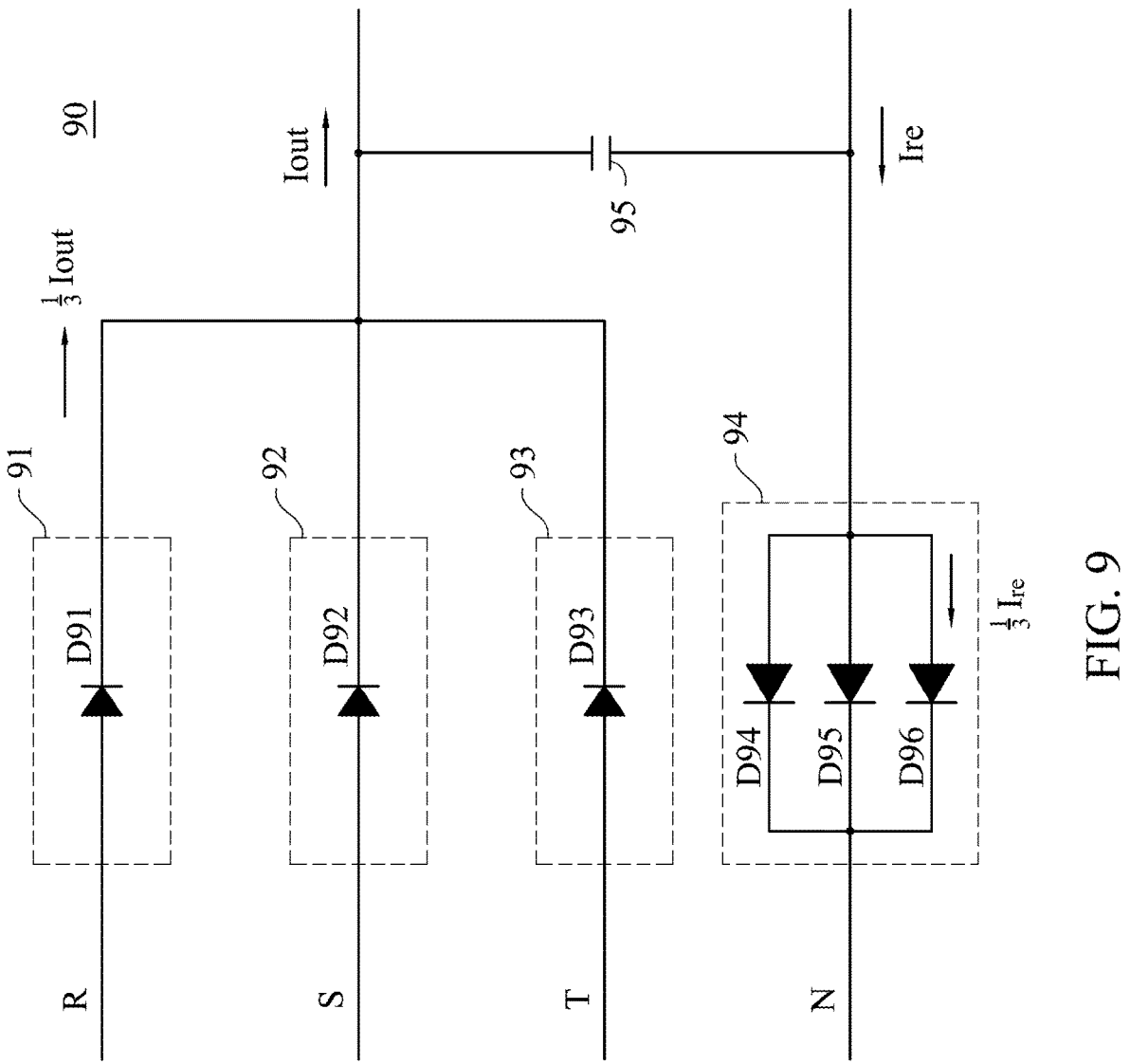
FIG. 9 is a schematic diagram of an electronic transformer in accordance with some embodiments of the present disclosure.

FIG. 9 is a schematic diagram of an electronic transformer 90 in accordance with some embodiments of the present disclosure. The electronic transformer 90 is applicable to the three-phase four-wire power system 4 in FIG. 4 in replace of the electronic transformer 40. Structurally, the electronic transformer 90 includes a first forward rectifier 91, a second forward rectifier 92, a third forward rectifier 93, a backward rectifier 94 and a capacitor 95. The first forward rectifier 91 includes a diode D91; the second forward rectifier 92 includes a diode D92; the third forward rectifier 93 includes a diode D93; and the backward rectifier 94 includes diodes D94, D95, D96.

In some embodiments, the ratio of the number of diodes in each forward rectifier to the number of diodes in the backward rectifier is 1:3. That is, each of the first forward rectifier, the second forward rectifier and the third forward rectifier includes K diodes that are connected in parallel, and the reverse rectifier includes three groups of K diodes that are connected in parallel. For illustration, in this embodiment, the forward rectifier 91/92/93 includes one diode D91/D92/D93, and the backward rectifier 94 includes three diodes D94, D95, D96, and thus the ratio of the number of diodes in the forward rectifier 91/92/93 to the number of diodes in the backward rectifier 94 is 1:3. From another point of view, the number of diodes in the three forward rectifiers 91, 92, 93 (i.e. the three forward biased diodes D91, D92, D93) is identical to the number of diodes in the backward rectifier 94 (i.e. the three backward biased diodes D94, D95, D96).

In the configuration of FIG. 9, in the long term, the average current through each of the three forward biased diodes D94, D92, D96 is (1/3)*Iout, and the average current through each of the three backward diodes D94, D95, D96 is (1/3)*Ire. Therefore, the output current Iout is balancedly distributed to the three forward biased diodes D94, D95, D96, and the return current Ire is balancedly distributed to the three backward biased diodes D94, D95, D96, and as such the problem of specific elements being damaged in a short time due to more frequent high current (i.e. unbalanced current distribution), so as to let the operating temperature of the electronic transformer 90 more stable.

As can be seen from the embodiment of FIG. 5, the current of each diode decreases as the number of diodes K connected in parallel increases, such that the loss of each diode is reduced. Thus, in some embodiments, if the number K of diodes in parallel connection is 2, then each of the forward rectifiers 91, 92, 93 includes two diodes in parallel connection, and the backward rectifier 94 includes six diodes in parallel connection, and so on.

Figure 10:
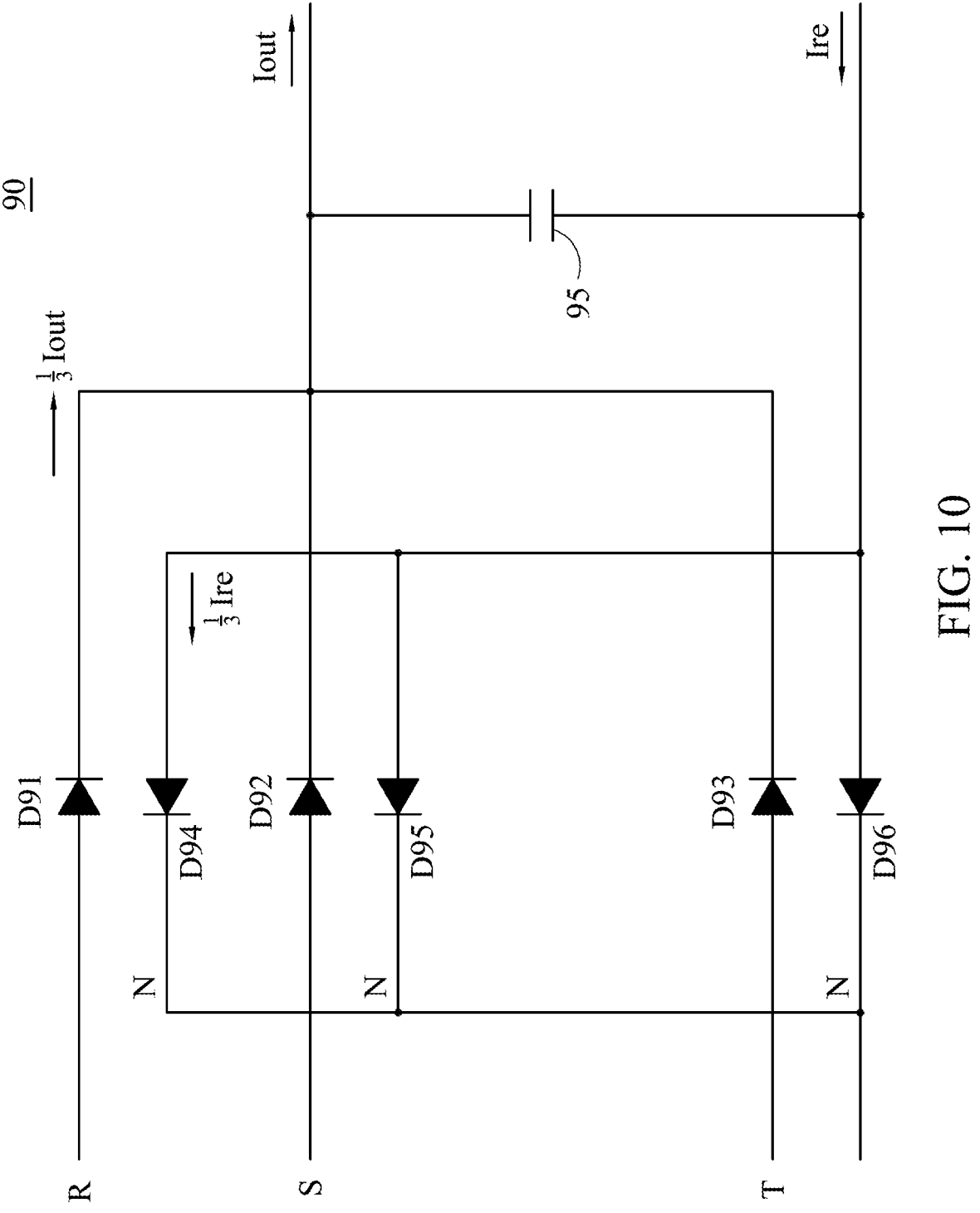
FIG. 10 is a schematic diagram of an electronic transformer in accordance with some embodiments of the present disclosure.

FIG. 10 is a schematic diagram of an electronic transformer 99 in accordance with some embodiments of the present disclosure. The electronic transformer 99 and 90 include the same elements as well as the same connection relationship between elements. The difference between the electronic transformers 99 and 90 is that, in the electronic transformers 99, the diodes D91, D92 and D93 are respectively adjacent to the diodes D94, D95 and D96. For each of the forward biased and backward biased diodes, the amplitudes of the forward current (1/3)*Iout and the backward current (1/3)*Ire are identical, the directions of the forward current (1/3)*Iout and the backward current (1/3)*Ire are opposite, and a differential pair is formed when a forward biased diode is disposed adjacent to a backward biased diode and its circuit. As such, the energy transmission efficiency of the three-phase power sources can be improved.

Figure 11:
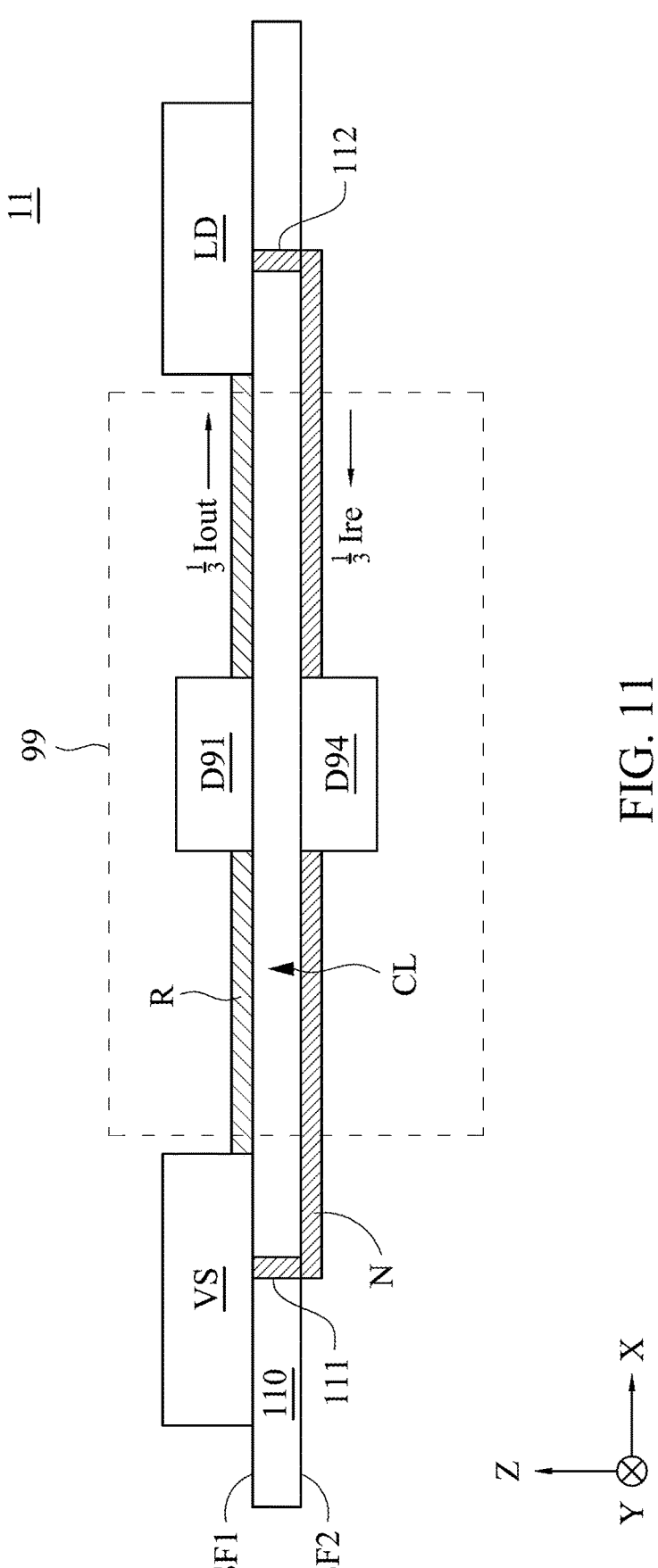
FIG. 11 is a layout diagram of the electronic transformer and the three-phase four-wire power system shown in FIG. 10.

FIG. 11 is a layout diagram of the electronic transformer 99 and the three-phase four-wire power system 11 shown in FIG. 10. The three-phase four-wire power system 11 includes a circuit board 110 formed in the XY plane; the circuit board 110 includes a first surface SF1 and a second surface SF2. Structurally, the power supply VS, the diode D91 in the forward rectifier 91 (the diodes D92, D93 in the forward rectifiers 92, 93 are not illustrated), the live line for transmitting the first phase power source R (the live lines for transmitting the second phase power source S and the third phase power source T are not illustrated) and the load LD are disposed on the first surface SF1, the diode D94 in the backward rectifier 94 (the diodes D95, D96 are not illustrated) and the neutral line N are disposed on the second surface SF2. A first through via 111 is formed in the circuit board 110 and extends in the Z direction for connecting the power supply VS and the neutral line N. A second through via 112 is formed in the circuit board 110 and extends in the Z direction, and is configured to connect the load L and the neutral line N. In one embodiment, a connector may be disposed on the circuit board 110 to connect the power supply VS, and another connector may be disposed on the circuit board 110 to connect the load LD, and thus the power supply VS and the load LD may be external devices.

In the configuration of FIG. 11, after the forward current (1/3)*Iout generated by the forward biased diode D91 is provided to the load LD through the live line, the backward current (1/3)*Ire generated by the load LD is provided to the backward diode D94, and then returns to the power supply VS through the neutral line N. As such, a complete current loop CL is formed between the power supply VS, the electronic transformer 99 and the load LD, and the operations of the forward output current and the backward return current are symmetrical and balanced, thereby improving the operational efficiency of the three-phase four-wire power system 11.

In one embodiment, the projections of the live lines for transmitting the first-phase power source, the second-phase power source and the third-phase power source and the forward biased diodes (including the diodes D91, D92, D93) on the first surface SF1 and the projections of the neutral line and the diodes (including the diodes D94, D95, D96) on the second surface SF2 are staggered in the XY plane. In this structure, the area of the current loop CL is approximately the thickness of the circuit board 110 in the Z direction and the line length of neutral line N (or the live lines) along the X direction, such that the area of current loop CL is approximately the minimum value for minimizing the electromagnetic radiation (i.e. energy consumption) generated by the current loop CL. In another embodiment, if the circuit board 110 is a multilayer board (e.g. with four, six or more layers), then at least one of the live lines for transmitting the three-phase power sources R, S, T and the neutral line N may be formed in the internal layers of the circuit board 110, so as to further reduce the area of the current loop CL and achieves electromagnetic shielding by the surface layer of the circuit board 110 for minimizing the electromagnetic radiation (i.e. energy consumption) generated by the current loop CL.

In summary, the electronic transformer and the three-phase four-wire power supply system thereof according to the present disclosure perform half-wave rectification respectively on the three-phase power sources through three forward rectifiers to generate an output current with balanced distribution at the first output end. Therefore, the present disclosure solves the problem of specific elements being damaged in a short time due to more frequent high current (i.e. unbalanced current distribution). In addition, after being rectified by the backward rectifier, the return current generated by the load returns to the power supply through the neutral line, such that a complete current loop is formed between the power supply, the electronic transformer and the load, and the operations of the forward output current and the backward return current are symmetrical and balanced, thereby improving the operational efficiency of the three-phase four-wire power supply system. The electronic transformer and the three-phase four-wire power supply system thereof according to the present disclosure have the following advantages: (1) stable output voltage; (2) output current with balanced distribution; (3) simplified circuit design as well as less layout area and cost; and (4) stable and time-invariant operating temperature.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. An electronic transformer, comprising:
   a first forward rectifier coupled between a first-phase power source and a first output terminal;
   a second forward rectifier coupled between a second-phase power source and the first output terminal;
   a third forward rectifier coupled between a third-phase power source and the first output terminal; and
   a backward rectifier coupled between a neutral line and a second output terminal, wherein each of the first forward rectifier, the second forward rectifier, the third forward rectifier and the backward rectifier includes 2 to 5 diodes, and any one of the diodes is directly connected in parallel with each of the other diodes;
   wherein the first forward rectifier, the second forward rectifier and the third forward rectifier are configured to perform half-wave rectification on the first-phase power source, the second-phase power source and the third-phase power source to generate a rectified first-phase power source, a rectified second-phase power source and a rectified third-phase power source, and to superpose the rectified first-phase power source, the rectified second-phase power source and the rectified third-phase power source at the first output terminal as an output voltage of the electronic transformer.

2. The electronic transformer of claim 1, further comprising:
   a capacitor coupled between the first output terminal and the second output terminal and configured to store energy and filter the output voltage.

3. The electronic transformer of claim 1, wherein the output voltage is supplied to a load to generate a return current at the second output terminal; and the backward rectifier is configured to perform half-wave rectification on the return current to generate a rectified return current, and transmits the rectified return current to a power supply through the neutral line.

4. The electronic transformer of claim 1, wherein:
   an anode of each diode in the first forward rectifier is coupled to the first-phase power source, an anode of each diode in the second forward rectifier is coupled to the second-phase power source, an anode of each diode in the third forward rectifier is coupled to the third-phase power source, a cathode of each diode in the first forward rectifier, the second forward rectifier and the third forward rectifier is coupled to the first output terminal, a cathode of each diode in the backward rectifier is coupled to the neutral line, and an anode of each diode in the backward rectifier is coupled to the second output terminal.

5. The electronic transformer of claim 1, wherein a ratio of the number of diodes in each of the first forward rectifier, the second forward rectifier and the third forward rectifier to the number of diodes in the backward rectifier is 1:3.

6. The electronic transformer of claim 5, wherein diodes in the first forward rectifier, the second forward rectifier and the third forward rectifier are respectively adjacent to diodes in the backward rectifier.

7. The electronic transformer of claim 5, wherein each of the first forward rectifier, the second forward rectifier and the third forward rectifier comprises K diodes that are connected in parallel, and the backward rectifier comprises three groups of K diodes that are connected in parallel, wherein K is an integer of 2 to 5.

8. The electronic transformer of claim 7, wherein:
an anode of each diode in the first forward rectifier is coupled to the first-phase power source, an anode of each diode in the second forward rectifier is coupled to the second-phase power source, an anode of each diode in the third forward rectifier is coupled to the third-phase power source, a cathode of each diode in the first forward rectifier, the second forward rectifier and the third forward rectifier is coupled to the first output terminal, a cathode of each diode in the backward rectifier is coupled to the neutral line, and an anode of each diode in the backward rectifier is coupled to the second output terminal.

9. A three-phase four-wire power system, comprising:
a power supply configured to provide a first-phase power source, a second-phase power source and a third-phase power source, the power supply having a neutral line;
a load; and
an electronic transformer coupled between the power supply and the load, the electronic transformer comprising:
a first forward rectifier coupled between the first-phase power source and a first output terminal;
a second forward rectifier coupled between the second-phase power source and the first output terminal;
a third forward rectifier coupled between the third-phase power source and the first output terminal; and
a backward rectifier coupled between the neutral line and a second output terminal, wherein each of the first forward rectifier, the second forward rectifier, the third forward rectifier and the backward rectifier comprises 2 to 5 diodes, and any one of the diodes is directly connected in parallel with each of the other diodes;
wherein the first forward rectifier, the second forward rectifier and the third forward rectifier are configured to perform half-wave rectification on the first-phase power source, the second-phase power source and the third-phase power source to generate a rectified first-phase power source, a rectified second-phase power source and a rectified third-phase power source, and to superpose the rectified first-phase power source, the rectified second-phase power source and the rectified third-phase power source at the first output terminal as an output voltage of the electronic transformer.

10. The three-phase four-wire power system of claim 9, wherein the electronic transformer further comprises:
a capacitor coupled between the first output terminal and the second output terminal and configured to store energy and filter the output voltage.

11. The three-phase four-wire power system of claim 9, wherein the output voltage is supplied to the load to generate a return current at the second output terminal; and the backward rectifier is configured to perform half-wave rectification on the return current to generate a rectified return current, and transmits the rectified return current to the power supply through the neutral line.

12. The three-phase four-wire power system of claim 9, wherein:
an anode of each diode in the first forward rectifier is coupled to the first-phase power source, an anode of each diode in the second forward rectifier is coupled to the second-phase power source, an anode of each diode in the third forward rectifier is coupled to the third-phase power source, a cathode of each diode in the first forward rectifier, the second forward rectifier and the third forward rectifier is coupled to the first output terminal, a cathode of each diode in the backward rectifier is coupled to the neutral line, and an anode of each diode in the backward rectifier is coupled to the second output terminal.

13. The three-phase four-wire power system of claim 9, wherein a ratio of the number of diodes in each of the first forward rectifier, the second forward rectifier and the third forward rectifier to the number of diodes in the backward rectifier is 1:3.

14. The three-phase four-wire power system of claim 13, wherein diodes in the first forward rectifier, the second forward rectifier and the third forward rectifier are respectively adjacent to diodes in the backward rectifier.

15. The three-phase four-wire power system of claim 13, wherein each of the first forward rectifier, the second forward rectifier and the third forward rectifier comprises K diodes that are connected in parallel, and the backward rectifier comprises three groups of K diodes that are connected in parallel, wherein K is an integer of 2 to 5.

16. The three-phase four-wire power system of claim 15, wherein:
an anode of each diode in the first forward rectifier is coupled to the first-phase power source, an anode of each diode in the second forward rectifier is coupled to the second-phase power source, an anode of each diode in the third forward rectifier is coupled to the third-phase power source, a cathode of each diode in the first forward rectifier, the second forward rectifier and the third forward rectifier is coupled to the first output terminal, a cathode of each diode in the backward rectifier is coupled to the neutral line, and an anode of each diode in the backward rectifier is coupled to the second output terminal.

17. The three-phase four-wire power system of claim 13, further comprising a circuit board that is formed in a plane of a first direction and a second direction, the circuit board comprising:
a first surface on which the power supply, the diodes of the first forward rectifier, the second forward rectifier and the third forward rectifier, live lines used for transmitting the first-phase power source, the second-phase power source and the third-phase power source and the load are disposed; and
a second surface on which diodes in the backward rectifier and the neutral line are disposed,
wherein projections of the live lines for transmitting the first-phase power source, the second-phase power source and the third-phase power source and diodes in the first forward rectifier, the second forward rectifier and the third forward rectifier and projections of the neutral line and the diodes in the backward rectifier are staggered in the plane.

18. The three-phase four-wire power system of claim 17, further comprising:
a first through via disposed in the circuit board and extending in a third direction, the first through via configured to connect the power supply and the neutral line; and
a second through via disposed in the circuit board and extending in the third direction, the second through via configured to connect the load and the neutral line.

* * * * *